United States Defensive Publication [19] (H) [11] T100,201

Logullo [43] Jan. 6, 1981

[54] INDIGO DYEING OF POLYESTER FIBERS

[75] Inventor: Francis M. Logullo, Hockessin, Del.

[73] Assignee: E. I. Du Pont de Nemours and Company, Wilmington, Del.

[21] Appl. No.: 119,212

[22] Filed: Feb. 7, 1980

[51] Int. Cl.[3] ..... D06P 1/22; D06P 7/00

[52] U.S. Cl. ..... 8/495; 8/653

[57] ABSTRACT

Polyester fiber can be dyed with indigo so as to possess washdown and fading characteristics similar to indigo-dyed cotton fibers provided they are first coated with a polymeric salt having the following repeating units:

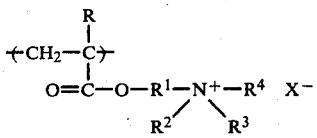

A.

with from 0 to 75 mol % of another ethylenically unsaturated monomeric unit, or

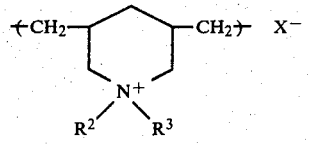

B.

wherein

R is hydrogen, methyl or ethyl $R^1$ is a divalent hydrocarbon radical of 1 to 4 C atoms $R^2$ and $R^3$ are lower alkyl (from 1 to 4 C atoms)

$R^4$ is hydrogen, hydroxyethyl or lower alkyl (from 1 to 4 C atoms)

$X^-$ is an anion

Preferably, in Formula A, $R^1$ contains 2 carbon atoms; $R^2$=$R^3$=$R^4$=methyl; and $X^-$ is 83 mol % $CH_3SO_4$— and 17 mol % $C_{18}H_{35}SO_4$—.

4 Claims, No Sheets Drawing,

19 Pages Specification

The file of this unexamined application may be inspected and copies thereof may be purchased (849 O.G. 1221, Apr. 9, 1968).